US009718709B2

(12) United States Patent
Summers et al.

(10) Patent No.: US 9,718,709 B2
(45) Date of Patent: Aug. 1, 2017

(54) MULTI-STAGE MEMBRANE DISTILLATION PROCESS

(71) Applicants: Edward K. Summers, Cambridge, MA (US); John H. Lienhard, V, Lexington, MA (US)

(72) Inventors: Edward K. Summers, Cambridge, MA (US); John H. Lienhard, V, Lexington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 607 days.

(21) Appl. No.: 13/798,273

(22) Filed: Mar. 13, 2013

(65) Prior Publication Data

US 2014/0263060 A1 Sep. 18, 2014

(51) Int. Cl.
*B01D 15/00* (2006.01)
*B01D 35/18* (2006.01)
(Continued)

(52) U.S. Cl.
CPC .......... *C02F 1/447* (2013.01); *C02F 2103/08* (2013.01); *C02F 2209/03* (2013.01)

(58) Field of Classification Search
CPC .. B01D 61/364; B01D 2311/04; B01D 61/36; B01D 2311/2669; B01D 2311/106; C02F 9/00; C02F 1/447; C02F 1/04; C02F 1/14
See application file for complete search history.

(56) References Cited

U.S. PATENT DOCUMENTS 5,494,556 A * 2/1996 Mita et al. .................. 203/2
7,459,084 B2 * 12/2008 Baig et al. .................. 210/640
(Continued)

OTHER PUBLICATIONS

Author: Edward K. Summers Title: Energy efficiency comparison of single-stage membrane distillation (MD) desalination cycles in different configurations Date: Feb. 2012 Publisher: Desalination 290 (2012) 54-96.*

(Continued)

*Primary Examiner* — Ana Fortuna
(74) *Attorney, Agent, or Firm* — Modern Times Legal; Robert J. Sayre (57) ABSTRACT

Portions of a feed liquid are passed through respective condensers and liquid-liquid heat exchangers. The feed liquid is then heated and injected into a first feed-liquid containment chamber, where vapor from the feed is passed through a first gas-permeable membrane and directed into a first condenser, where the vapor is cooled by the feed liquid passing through the first condenser and condenses as it cools to produce a first liquid permeate. The first liquid permeate is passed through the first liquid-liquid heat exchanger where the first liquid permeate is cooled by the feed liquid passing therethrough. After the vapor is removed from the feed liquid in the first feed-liquid containment chamber, the remaining feed liquid from the first feed-liquid containment chamber is injected into a second feed-liquid containment chamber, where the process is repeated. The first liquid permeate from the first liquid liquid-liquid heat exchanger is combined with the second liquid permeate from the second condenser to form a combined liquid permeate; and the combined liquid permeate is passed through the second liquid-liquid heat exchanger where the combined liquid permeate is cooled by the feed liquid passing therethrough.

17 Claims, 5 Drawing Sheets

(51) Int. Cl.
  *C02F 1/44* (2006.01)
  *C02F 1/02* (2006.01)
  C02F 103/08 (2006.01)

(56) References Cited

U.S. PATENT DOCUMENTS

| | | | |
|---|---|---|---|
| 8,007,874 B2* | 8/2011 | Nojo | B05C 9/14 427/560 |
| 2009/0000939 A1 | 1/2009 | Heinzl | |
| 2012/0152840 A1* | 6/2012 | Fujita | B01D 53/22 210/640 |
| 2013/0153497 A1* | 6/2013 | Arafat | 210/640 |

OTHER PUBLICATIONS

Author: Zhao Kui Title: Demonstrating solar-driven membrane distillation using Memsys Vacuum-multi-effect-membrane-distillation Date: Sep. 4-9, 2011 Publisher: World Congress/ Perth convention and exhibition centre.*

US Patent and Trademark Office, International Search Report and Written Opinion for PCT/US2014/021534 (related PCT application) (Aug. 27, 2014).

Edward K. Summers, et al., "Energy Efficiency Comparison of Single-Stage Membrane Distillation (MD) Desalination Cycles in Different Configurations", 290 Desalination 54-66 (Feb. 2012).

Zhao Kui, et al., "Demonstrating Solar-Driven Membrane Distillation Using Memsys Vacuum-Multi-Effect Membrane Distillation", IDA World Congress, Australia (Sep. 2011).

* cited by examiner

MULTI-STAGE MEMBRANE DISTILLATION PROCESS

BACKGROUND

In this century, the shortage of fresh water may surpass the shortage of energy as a global concern for humanity, and these two challenges are inexorably linked, as explained, e.g., in the "Special Report on Water" in the 20 May 2010 issue of *The Economist*. Fresh water is one of the most fundamental needs of humans and other organisms; each human needs to consume a minimum of about two liters per day. The world also faces greater freshwater demands from farming and industrial processes.

The hazards posed by insufficient water supplies are particularly acute. A shortage of fresh water may lead to a variety of crises, including famine, disease, death, forced mass migration, cross-region conflict/war, and collapsed ecosystems. Despite the criticality of the need for fresh water and the profound consequences of shortages, supplies of fresh water are particularly constrained. 97.5% of the water on Earth is salty, and about 70% of the remainder is locked up as ice (mostly in ice caps and glaciers), leaving only a fraction of all water on Earth as available fresh (non-saline) water.

Moreover, the earth's water that is fresh and available is not evenly distributed. For example, heavily populated countries, such as India and China, have many regions that are subject to scarce supplies. Further still, the supply of fresh water is often seasonally inconsistent. Meanwhile, demands for fresh water are tightening across the globe. Reservoirs are drying up; aquifers are falling; rivers are dying; and glaciers and ice caps are retracting. Rising populations increase demand, as do shifts in farming and increased industrialization. Climate change poses even more threats in many regions. Consequently, the number of people facing water shortages is increasing. Naturally occurring fresh water, however, is typically confined to regional drainage basins; and transport of water is expensive and energy-intensive.

One method for obtaining fresh water from sea water is membrane distillation, wherein water from a heated saline liquid stream is allowed to vaporize through a hydrophobic microporous membrane. Membrane distillation is thermally driven, where a temperature difference across the two sides of the membrane leads to a vapor-pressure difference that causes water to evaporate from the hot side of the membrane and pass through the pores as vapor to the cold side. Additionally, membrane distillation runs at relatively low pressure, can withstand high salinity feed streams, and is potentially more resistant to fouling than other distillation approaches. Consequently, membrane distillation can be used for desalination where reverse osmosis is not a practical option. The use of thermal energy, rather than electrical energy, and the fact that membranes for membrane distillation can withstand dryout make this technology attractive for renewable power applications, as well. However, most research on membrane distillation has focused on maximizing membrane flux as opposed to minimizing energy consumption and cost [see E. K. Summers, H. A. Arafat, J. H. Lienhard V, "Energy Efficiency Comparison of Single-Stage Membrane Distillation (MD) Desalination Cycles in Different Configurations," Desalination, 290, pp. 54-66 (2011)]; and current membrane distillation systems suffer from poor energy efficiency compared to other desalination systems.

Membrane-distillation systems can be used in many configurations, depending on how liquid is collected from the permeate (cold) side. In direct-contact membrane distillation (DCMD), the vapor is condensed on a pure water stream that contacts the other side of the membrane. In air-gap membrane distillation (AGMD), an air gap separates the membrane from a cold condensing plate which collects vapor that moves across the gap. In sweeping-gas membrane distillation (SGMD), a carrier gas is used to remove the vapor, which is condensed in a separate component. SGMD is typically used for removing volatile vapors and is typically not used in desalination.

Vacuum membrane distillation (VMD) is another variation of membrane distillation in which the driving pressure difference is increased by lowering the pressure on the vapor (cold) side of the membrane. The heat of vaporization is then recovered in an external condenser. This process has been applied to the desalination of seawater. However, energy recovery is limited by the saturation temperature of the pressure in the condenser; and maximizing flux by increasing the pressure difference between the saline feed and the condenser results in poor energy recovery.

In desalination systems, recovering the energy given off in condensation increases the thermal efficiency of the system, which is strongly correlated with low water cost. Some studies of VMD from an energy efficiency point of view have been conducted, but typically report low performance. Performance as measured by the Gained Output Ratio (GOR) is below 1 for these systems [A. Criscuoli, et al., "Evaluation of energy requirements in membrane distillation", 47 Chemical Engineering and Processing: Process Intensification, Euromembrane 2006, 1098-1105 (2008); and X. Wang, et al., "Feasibility research of potable water production via solar-heated hollow fiber membrane distillation system, 247 Desalination 403-411 (2009)].

GOR is the ratio of the latent heat of evaporation of a unit mass of product water to the amount of energy used by a desalination system to produce that unit mass of product. The higher the GOR, the better the performance. For example, a solar still would have a GOR on the order of 1, whereas a good multi-effect distillation system may have a GOR of 12.

A low GOR arises from the fact that energy recovery is limited by the saturation temperature of the pressure in the condenser. Maximizing flux by increasing the pressure difference between the saline feed and the condenser lowers the condensation temperature in the condenser, which requires high mass flow rates of colder water to condense the additional vapor, when compared to a system with a smaller pressure difference (higher saturation temperature) and lower flux. This trade-off, however, results in poor energy recovery.

SUMMARY

A multi-stage membrane distillation apparatus and method for multi-stage membrane distillation are described herein. Various embodiments of the apparatus and methods may include some or all of the elements, features and steps described below.

One embodiment of a multi-stage membrane distillation apparatus includes a source of liquid feed, a plurality of purification stages, a liquid-feed conduit extending from the source of liquid feed, a liquid-permeate extraction conduit, and at least one vacuum source.

Each of the plurality of purification stages respectively includes a vacuum membrane distillation module, including a feed inlet in fluid communication with the source of liquid feed; a gas-permeable membrane contained in the vacuum membrane distillation module; a feed-liquid containment chamber for containing liquid feed from the feed inlet, wherein the feed-liquid containment chamber is positioned on one side of the gas-permeable membrane and is in fluid communication with the feed inlet; a vapor-permeate-containment chamber for containing vapor permeated from liquid feed through the gas-permeable membrane, wherein the vapor-permeate-containment chamber is positioned on an opposite side of the gas-permeable membrane from the feed-liquid containment chamber; and a vapor-permeate outlet in fluid communication with the vapor-permeate-containment chamber for extracting the vapor permeate from the vapor-permeate-containment chamber.

The condenser is configured to condense the vapor permeate and includes (a) a vapor-permeate inlet in fluid communication with the vapor-permeate outlet of the vacuum membrane distillation module and (b) a condensed liquid-permeate outlet through which condensed liquid permeate can be removed from the condenser.

The liquid-liquid heat exchanger is in fluid communication with the liquid-permeate outlet of the condenser and is configured for cooling condensed liquid permeate from the condenser.

The liquid-feed conduit extends from the source of liquid feed and includes a bifurcation between (a) the liquid-feed source and (b) the condenser and the liquid-liquid heat exchanger in a flow path from the liquid-feed source through the liquid-feed conduit, where the bifurcation splits the liquid-feed conduit into respective conduits passing through the condenser and through the liquid-liquid heat exchanger, and a junction configured to rejoin the set of bifurcated conduits from the condenser and the liquid-liquid heat exchanger into a common conduit extending toward and in fluid communication with the liquid-feed-containment chamber of the vacuum membrane distillation module.

The liquid-permeate extraction conduit including a plurality of liquid-permeate inlets, each respectively in fluid communication with the liquid-permeate outlet of the condenser of a respective purification stage, wherein the liquid-permeate extraction conduit is configured to pass condensed liquid permeate from the liquid-permeate inlets through the liquid-liquid heat exchangers.

The vacuum source in fluid communication with and configured to establish a reduced pressure in the vacuum membrane distillation modules and in the condensers.

In a method for distillation of a feed liquid, portions of the feed liquid are passed through a second condenser, through a first condenser, through a first liquid-liquid heat exchanger and through a second liquid-liquid heat exchanger. The feed liquid is then heated and injected into a first feed-liquid containment chamber. Vapor from the feed liquid in the first feed-liquid containment chamber is passed through a first gas-permeable membrane. Vapor that has passed through the first gas-permeable membrane is directed into the first condenser, where the vapor is cooled by the feed liquid passing through the first condenser and condenses as it cools to produce a first liquid permeate. The first liquid permeate is passed through the first liquid-liquid heat exchanger where the first liquid permeate is cooled by the feed liquid passing therethrough. After the gas is removed from the feed liquid in the first feed-liquid containment chamber, the remaining feed liquid from the first feed-liquid containment chamber is injected into a second feed-liquid containment chamber. Vapor from the feed liquid in the second feed-liquid containment chamber is then passed through a second gas-permeable membrane. A reduced pressure is established for the vapors passed through the first and second membranes; and vapor that has passed through the second gas-permeable membrane is directed into the second condenser, where the vapor is cooled by the feed liquid passing through the second condenser and condenses as it cools to produce a second liquid permeate. The first liquid permeate from the first liquid-liquid heat exchanger is combined with the second liquid permeate from the second condenser to form a combined liquid permeate; and the combined liquid permeate is passed through the second liquid-liquid heat exchanger where the combined liquid permeate is cooled by the feed liquid passing therethrough.

The apparatus and methods, described herein can provide a simple cycle in which many membrane modules and condensers can be cascaded at successively lower pressure as more vapor is removed from the feed and as the feed temperature decreases. By reducing the pressure step-wise over many stages, the feed can be preheated to a higher temperature in the condenser.

This type of cycle shares some similarities with multi-stage flash (MSF) desalination systems. MSF systems, however, generally require large-scale components and associated infrastructure, particularly for the flash chambers that produce vapor. By replacing the flash chambers with membrane-distillation modules, as described herein, a more-compact system can be built, lending itself to small-scale and off-grid desalination applications. Modeling has shown that these multi-stage vacuum-membrane-distillation systems can achieve performance comparable to MSF for the same operating conditions. Additionally, multi-stage vacuum-membrane-distillation can operate at lower temperatures without the need for a steam generator, allowing the use of low temperature heat sources, such as unconcentrated solar energy.

Advantages that can be offered by these methods and apparatus over reverse osmosis may include the following: no requirement for a high-pressure feed, an ability to tolerate complete dryout of the membrane, and a capacity for processing very-high-salinity brines. Compared to other large thermal processes, these methods are easily scalable. Demonstrated pilot plants have been used at a small scale (e.g., 0.1 $m^3$/day), including stand-alone systems disconnected from municipal power or water networks.

Additional advantages of this apparatus may include the potential use of lower-strength and less-expensive materials to support the (lower) pressure differences in embodiments of the methods and apparatus of this invention. Further still, the ability to use lower temperatures in embodiments of the methods and apparatus also means that the membrane and heat exchanger surfaces may be less prone to fouling.

In the accompanying drawings, like reference characters refer to the same or similar parts throughout the different views; and apostrophes are used to differentiate multiple instances of the same or similar items sharing the same reference numeral. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%, wherein percentages or concentrations expressed herein can be either by weight or by volume) can be understood as being within the scope of the description; likewise, if a particular shape is referenced, the shape is intended to include imperfect variations from ideal shapes, e.g., due to manufacturing tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Figure 1:
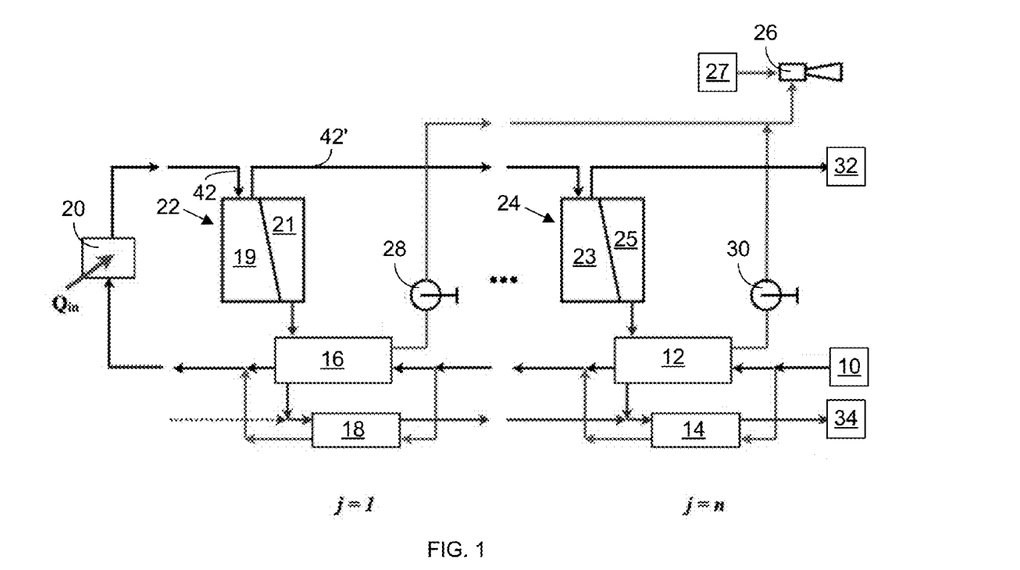
FIG. 1 is a schematic illustration of an embodiment of a multi-stage membrane distillation apparatus with a vapor condenser that is external to a vacuum membrane distillation module.

As shown in the embodiment illustrated in FIG. 1, a multi-stage membrane-distillation cycle can be carried out in a plurality of vacuum membrane-distillation modules 22, 24, each associated with a respective vapor condenser 12/16 and a liquid-liquid heat exchanger or "permeate cooler" 14/18, all of which are in fluid communication. In the embodiment of FIG. 1, the vapor condenser 12/16 is external to the vacuum membrane-distillation module 22/24. The condenser 12/16 can include corrugated metal tubing (e.g., from Felton Machine, Niagara Falls, N.Y.) through which the liquid feed can flow and on which the permeate vapor can condense.

A flow of feed liquid (e.g., sea water at 27° C.) is fed from the source 10 and split into respective portions that pass through the second condenser 12 and the second liquid-liquid heat exchanger 14. The two portions are then recombined and then again split into respective portions that pass through the first condenser 16 and the first liquid-liquid heat exchanger 18. These portions are then recombined and heated by a heat input ($Q_{in}$) at the heater 20, which can be, e.g., a solar heater, before being injected into a first feed-liquid containment chamber 19 in the first vacuum membrane distillation module 22. In the first vacuum membrane distillation module 22, water vapor from the feed liquid can permeate from the first feed-liquid containment chamber 19 through the membrane and into a first vapor-permeate containment chamber 21 in the first vacuum membrane distillation module 22 and then passed through the first condenser 16 where the vapor permeate can be condensed to form purified water.

The condensed water from the first condenser 16 is then passed through the first liquid-liquid heat exchanger 18, where heat from the condensed water is transferred to the feed liquid passing through the first liquid-liquid heat exchanger 18. After passing through the first liquid-liquid heat exchanger 18, the cooled water is passed through the second liquid-liquid heat exchanger 14, where additional heat is extracted from the condensed water and transferred to the feed liquid passing through the second liquid-liquid heat exchanger 18.

A concentrated remainder 42' of the feed liquid is extracted from the first feed-liquid containment chamber 19 after the water vapor is extracted and passed to a second feed-liquid containment chamber 23 in the second vacuum membrane distillation module 24, where water vapor from the concentrated remainder 42' of the feed liquid can permeate from the second feed-liquid containment chamber 23 through the membrane and into a second vapor-permeate containment chamber 25 in the second vacuum membrane distillation module 24 and then passed through the second condenser 12 where the vapor permeate can be condensed to form purified water.

The condensed water from the second condenser 12 is then combined with condensed water from first condenser 16 and passed through the second liquid-liquid heat exchanger 14, where heat from the condensed water is transferred to the feed liquid passing through the second liquid-liquid heat exchanger 14 before being ejected to a permeate outlet 34 (e.g., a reservoir of purified water).

A reduced vapor pressure is maintained in the first condenser 16 and a first vapor-permeate containment chamber 21 via a first regulator 28 in a conduit in fluid communication with the vacuum source 26. Likewise, a reduced vapor pressure is maintained in the second condenser 12 and a second vapor-permeate containment chamber 25 via a second regulator 30 in a conduit in fluid communication with the vacuum source 26.

Figure 4:
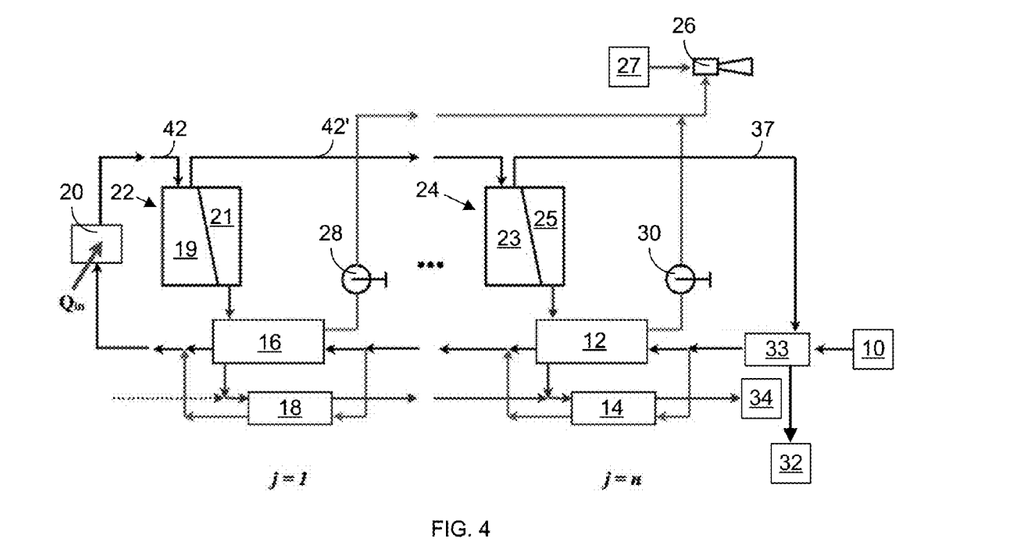
FIG. 4 is a is a schematic illustration of an embodiment of a multi-stage membrane distillation apparatus with a vapor condenser that is external to a vacuum membrane distillation module in which the brine output from the second stage is passed through a heat exchanger where thermal energy from the brine is transferred to the initial feed liquid.
Figure 5:
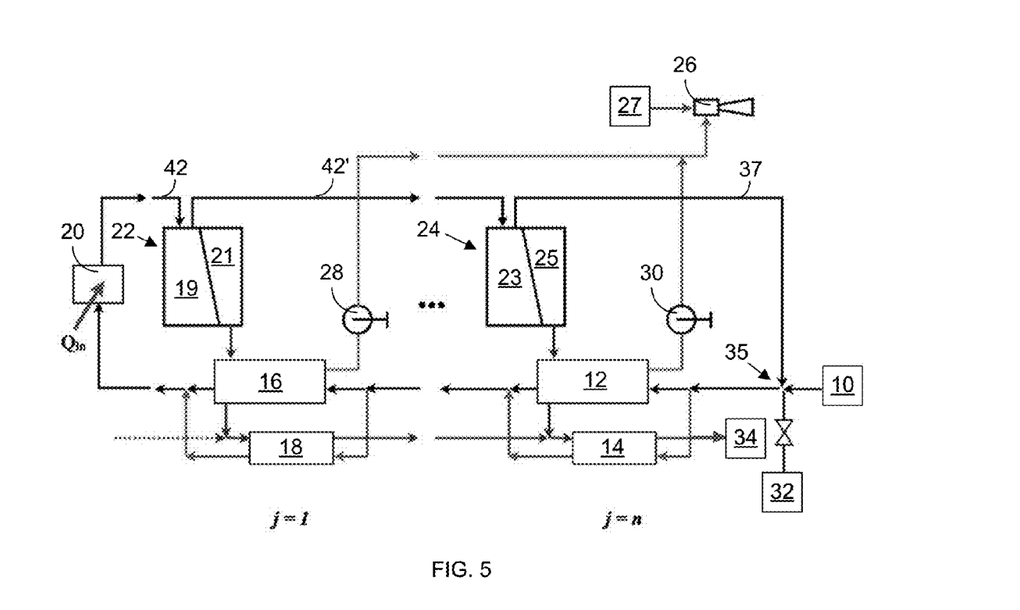
FIG. 5 is a is a schematic illustration of an embodiment of a multi-stage membrane distillation apparatus with a vapor condenser that is external to a vacuum membrane distillation module in which the brine output from the second stage is mixed with the initial feed liquid.

As shown in FIGS. 4 and 5, thermal energy from the brine output 37 of the second vacuum membrane distillation module 24 can be transferred to the initial feed liquid 42 from source 10 before the feed liquid 42 is passed through the condensers 12 and 16 and liquid-liquid heat exchangers 14 and 18. In the embodiment of FIG. 4, the feed liquid 42 and brine 37 are both passed through an additional heat exchanger 33, in which heat from the brine 37 is transferred to the cooler feed liquid 42. In the embodiment of FIG. 5, the brine 37 is injected into the conduit carrying the feed liquid 42 at a juncture 35 such that the brine 37 and feed liquid 42 physically mix (in which case, the brine 37 here as well provides initial heating to the feed liquid 42).

Figure 6:
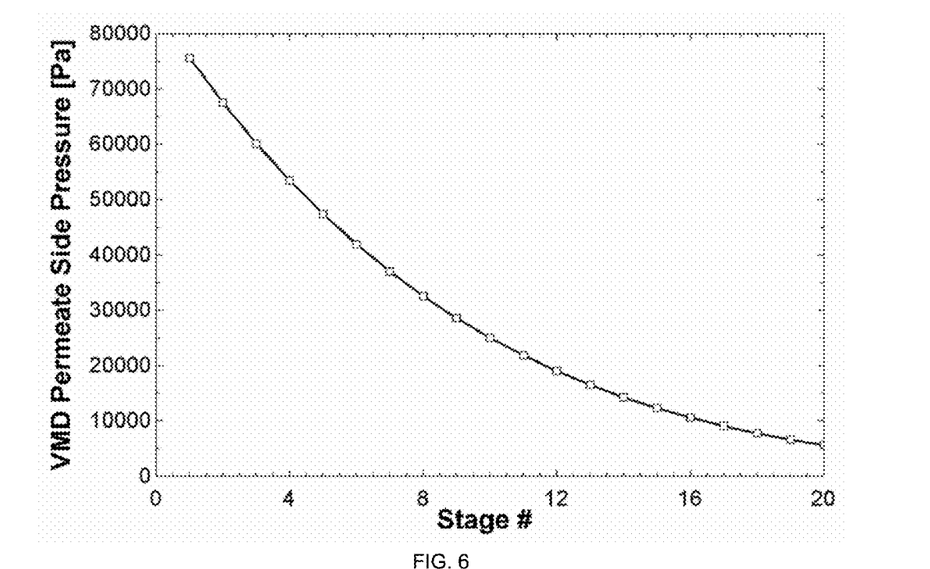
FIG. 6 is a plot of the pressure at each stage in an embodiment of the multi-stage membrane distillation module with 20 stages.
Figure 7:
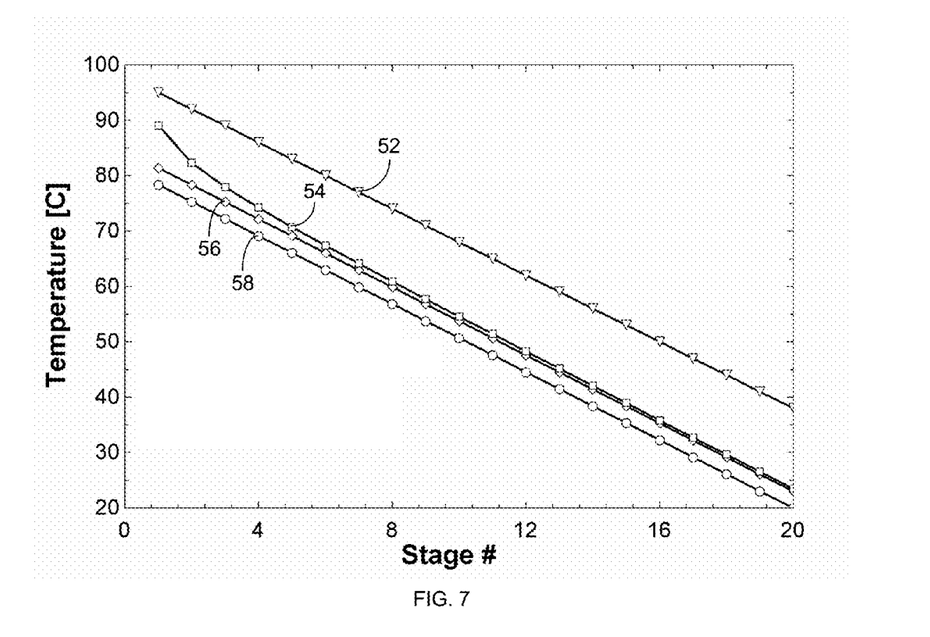
FIG. 7 is a plot of the temperature of feed liquid (saline water) streams at each stage of the 20-stage system.
Figure 8:
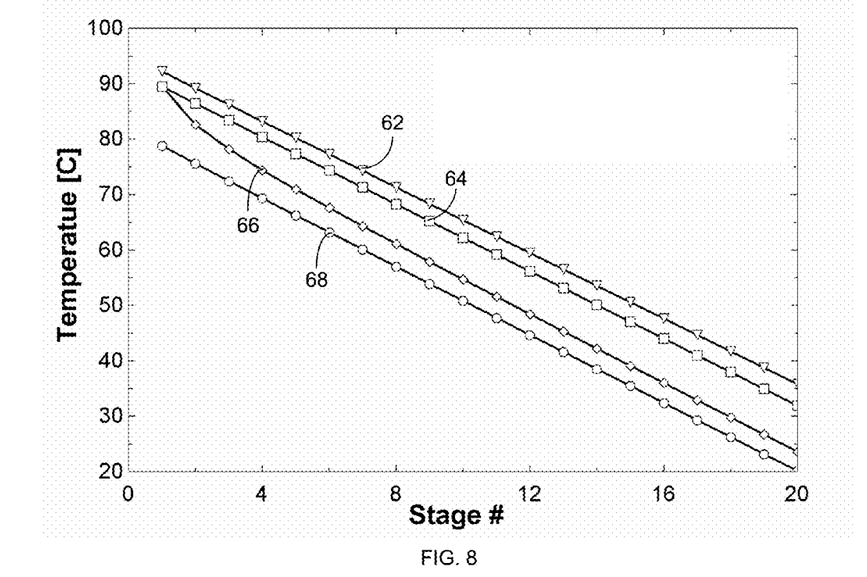
FIG. 8 is a plot of the temperature of purified (permeate) water streams at each stage of the 20-stage system.

Although two modules 22 and 24 are shown here, many more modules (with associated condensers and liquid-liquid heat exchangers) can be incorporated in series with the apparatus shown here to continue to extract additional purified water from the concentrated remainder of the feed liquid at each stage. After the final module, the remaining brine is ejected to a brine outlet 32. The respective pressure in the vapor-permeate containment chamber in each of up to 20 stages (i.e., 20 modules in series) is shown in FIG. 6, where the pressure can be seen to range from up to about 75 kPa in the first module down to about 5 kPa in the twentieth module. Additionally, in FIG. 7, the respective temperature of the feed liquid stream in each of the 20 stages is plotted as the feed liquid stream enters the module 52, as it exits the liquid-liquid heat exchanger 54, as it exits the condenser 56, and as it enters the condenser 58. Further still, FIG. 8 plots the temperature of the purified (permeate) water streams at each stage of the 20-stage system as the permeate stream exits the module (as vapor) 62, as it exits the condenser (as liquid) 64, as it enters the liquid-liquid heat exchanger (after mixing) 66, and as it exits the liquid-liquid heat exchanger 68.

Figure 2:
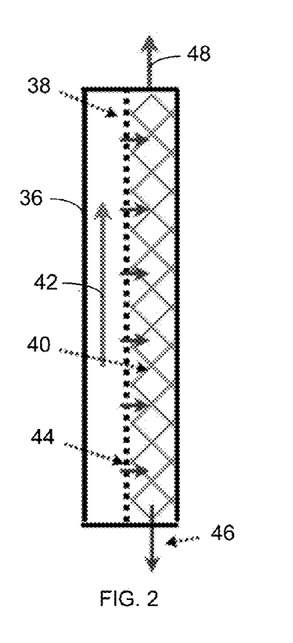
FIG. 2 is a sectional view showing the inside of an embodiment of the vacuum membrane distillation module.

The membrane distillation module 22/24 is typically made from some polymer material (e.g., polypropylene or acetyl). As shown in FIG. 2, attached to the housing 36 of the module 22/24 is a membrane 38 that is very hydrophobic [e.g., formed of polytetrafluoroethylene (PTFE), aka Teflon, or polyvinylidene fluoride (PVDF)]. The membrane 38 may or may not have a support layer manufactured onto the active layer of the membrane 38. The support is typically made from polypropylene, and provides additional mechanical strength to the membrane 38 and adds tearing resistance to tearing. Membranes 38 typically have a pore size of 0.2-0.5 micrometers and a thickness of 50-200 micrometers. The pore channels can be selected to balance the heat-transfer coefficient (to minimize temperature polarization) and pressure drop.

On one side of the membrane 38, a heated saline/contaminated water stream flows, coming from a heating step, as in the case with the first stage, or the reject from a previous membrane-distillation module 22/24, as with subsequent stages. A meniscus forms on the small pores and prevents liquid breakthrough. The water-vapor pressure of the water on the feed side of the membrane 38 increases with increasing temperature of the feed 42 (the feed 42 provides the latent heat of evaporation) and with higher molar fractions of water in the feed 42 at the membrane 38.

Driven by the pressure differential across the feed and condensate sides of the membrane, a vapor stream 44 from the heated liquid-feed stream evaporates from the surface of the meniscus, through the pores of the membrane 38, and enters a channel (to the right of the membrane 28, as shown) kept at reduced pressure by a mechanical pump or vapor compressor 26. Pressure is regulated at each stage (i.e., with a differential height water column, or other mechanical regulator). The reduced-pressure channel may also contain a woven screen/mesh 40 acting as a mechanical support against the pressure difference between the contaminated water stream 42 and the reduced-pressure vapor channel leading to the fresh water condensate flow 46.

Figure 3:
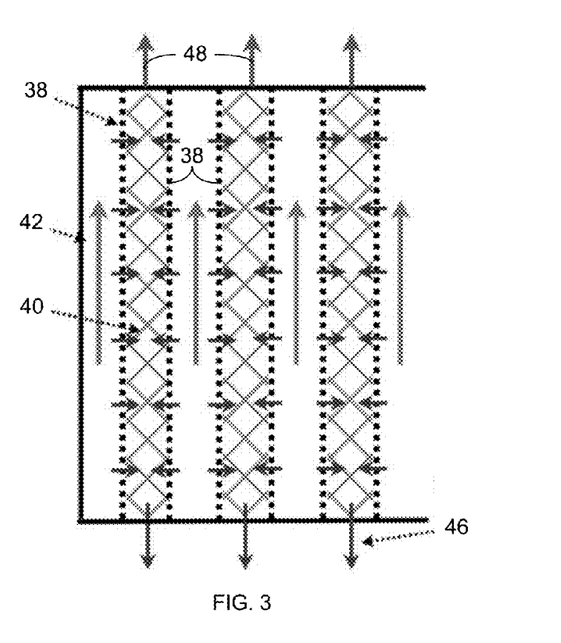
FIG. 3 is a sectional view showing the inside of an embodiment of the vacuum membrane distillation module with a plurality of membranes mounted in parallel.

As shown in FIG. 3, the membranes 38 can be laid out in parallel (e.g., 300 membrane sheets in parallel) with alternating feed 42 and vapor 46 channels, separated by spacers. The length in the flow direction is typically shorter than other membrane-distillation systems, and a typical aspect ratio may be 5:1. The membranes 38 can be sealed to the polymer housing 36 by adhesive, heat sealing or something similar. The housing 36 can also contain channels guiding liquid and vapor from piping connections to the channels.

The vapor then passes to a condenser 12/16, the interior of which is at the same reduced pressure of the attached membrane module 22/24. This is typically a standard steam condenser 12/16, made primarily of copper. The vacuum source 26, which is powered by an energy input 27, is connected through the condenser 12/16 to eliminate non-condensable vapors, such as air or carbon dioxide, and to maintain reduced pressure. The vacuum source 26 can establish a vacuum pressure sufficient to maintain the terminal temperature difference in the condenser at 3° C. The coolant comes from the inlet saline/contaminated stream flowing from the feed source 10, allowing the latent heat of condensation to pre-heat the stream.

Pure water from the condensers 12, 16 is sent to the liquid-liquid heat exchangers 14, 18. In stage 2 onward, the permeate joins the cooled permeate from the previous stage, which has been cooled to a temperature close to that of the permeate exiting the current stage. An amount of inlet water is bled off from the condenser 12/16 at that stage to act as cooling water for the liquid-liquid heat exchanger 14/18. This amount is determined by balancing the heat capacity rates (mass flow times specific heat capacity). In the last stage the permeate exits at the temperature close to the inlet fluid.

Pressure from each stage is determined by the difference of saturation temperature of water vapor in each stage. The set point pressure is the saturation pressure corresponding to that temperature. The difference in saturation temperature from stage to stage may be in the range of 1.5-3 degrees Celsius. The following figures show the temperature and pressure at each stage.

Figure 9:
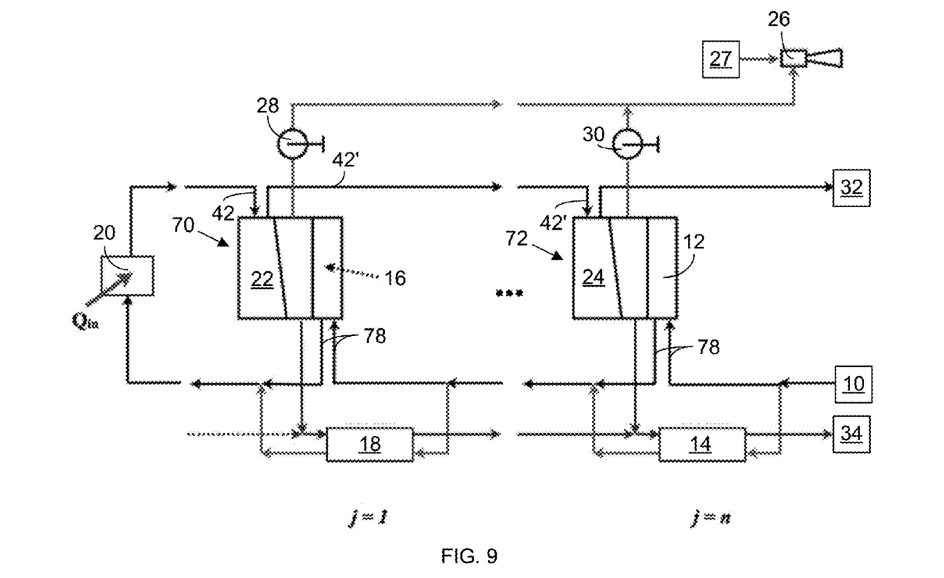
FIG. 9 is a schematic illustration of an embodiment of a multi-stage membrane distillation apparatus with a vapor condenser that is integrated in the vacuum membrane distillation module.
Figure 10:
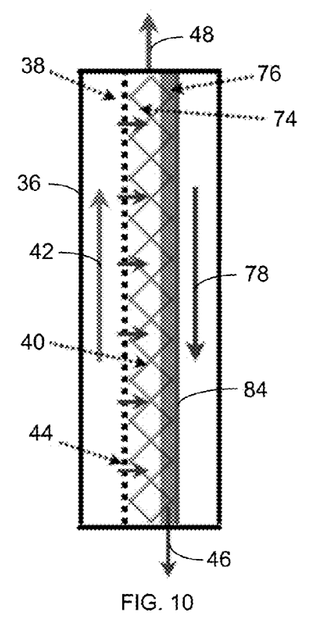
FIG. 10 is a sectional view of an embodiment of a vapor-membrane-distillation/air-gap hybrid module.

In another embodiment, illustrated in FIG. 9, the vapor condenser 12/16 is integrated with the membrane-distillation module 22/24. This embodiment is similar to the apparatus of FIG. 1 in layout, except the external condenser 12/16 of FIG. 1 is eliminated in favor of condensing the vapor that permeates (as shown with arrows 44) through the membrane 38 to form, e.g., liquid water 76 on a condensation surface 84 directly in the vapor-permeate containment chamber 21/25, wherein the purified water flows 46 out of the base of the chamber 21/25, as shown in FIG. 10. This can be considered a hybrid of a vacuum membrane distillation module 22/24 and an air-gap membrane-distillation module 70/72, as the vapor stream 44 diffuses across and is condensed inside an air gap 74 (e.g., having a thickness on the order of 1 mm), which provides thermal insulation between the hot liquid water stream 46 and the cold condensate 46.

The membrane 38 and module materials are similar to the system with an external condenser 12/16, except a copper or other highly thermally conductive material plate 84 is used to collect condensate 46. The surface of plate 84 may be enhanced to aid the removal of condensate droplets 76. The condensate film 76 thickness can be, e.g., one-tenth the width of the air gap 74. The membrane 38 and condenser surface 84 are separated with a spacer, and pressure is reduced in this space in the same way it would be for an external condenser system. The copper condenser plate 84 separates the initial contaminated/saline feed liquid stream 78 as it collects the energy of condensation from the condensed water 76, such that the initial feed liquid 78 acts as a coolant. The coolant 78 gains temperature and is passed to the next stage to again be used as a coolant 78. It continues being used as a coolant until it reaches the first stage, where it is then passed through a heater 20 and sent to the first feed-liquid containment chamber 19, where it is treated.

Figure 11:
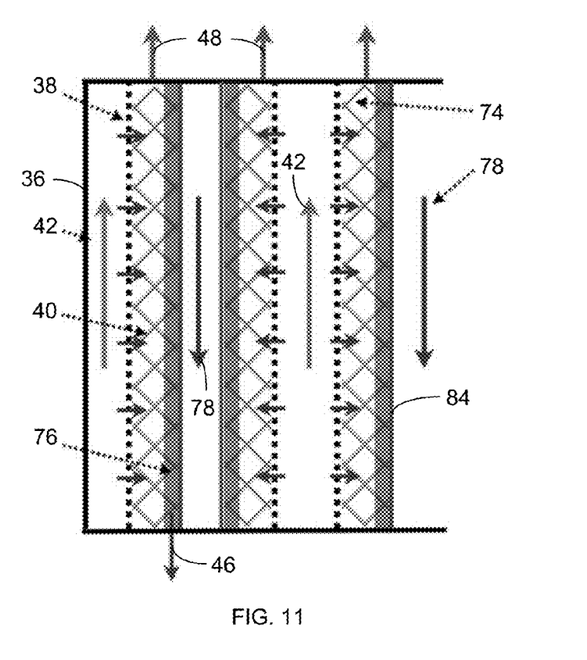
FIG. 11 is a sectional view of an embodiment of a vapor-membrane-distillation/air-gap hybrid module with a plurality of membranes mounted in parallel.

An embodiment of a vapor-membrane-distillation/air-gap hybrid module 70/72 with a plurality of membranes 38 mounted in parallel is shown in FIG. 11. In this embodiment, alternating and cross-flowing channels of vaporizing feed liquid 42 and coolant 78 are separated by the parallel membrane 38 and condenser assemblies.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A multi-stage membrane distillation apparatus, comprising:
   a source of liquid feed;
   a plurality of purification stages including at least a first purification stage configured to receive liquid feed from the source and a second purification stage configured to receive liquid feed from the first purification stage, each purification stage respectively including:
      a vacuum membrane distillation module, including:
         a feed inlet in fluid communication with the source of liquid feed;
         a gas-permeable membrane contained in the vacuum membrane distillation module;
         a feed-liquid containment chamber for containing liquid feed from the feed inlet, wherein the feed-liquid containment chamber is positioned on one side of the gas-permeable membrane and is in fluid communication with the feed inlet;
         a vapor-permeate containment chamber for containing vapor permeated from liquid feed through the gas-permeable membrane, wherein the vapor-permeate-containment chamber is positioned on an opposite side of the gas-permeable membrane from the feed-liquid containment chamber; and
         a vapor-permeate outlet in fluid communication with the vapor-permeate-containment chamber for extracting the vapor permeate from the vapor-permeate-containment chamber; and
      a condenser configured to condense the vapor permeate and including (a) a vapor-permeate inlet in fluid communication with the vapor-permeate outlet of the vacuum membrane distillation module and (b) a condensed liquid-permeate outlet through which condensed liquid permeate can be removed from the condenser;
   a heat source configured to heat liquid feed only between the source of liquid feed and the first purification stage, wherein no heat source is configured to heat liquid feed in or between the purification stages;

at least one liquid-remainder conduit configured to provide fluid communication from the feed-liquid containment chamber in the vacuum membrane distillation module of the first purification stage to the feed-liquid containment chamber in the vacuum distillation module of the second purification stages; and a plurality of regulators in fluid communication with and configured to establish a first reduced pressure in the vapor-permeate containment chamber of the first purification stage, a second reduced pressure in the vapor-permeate containment chamber of the second purification stage that is lower than the first reduced pressure, and a reduced condensing pressure in the condensers.

2. The multi-stage membrane distillation apparatus of claim 1, wherein the source of liquid feed includes liquid feed comprising water and dissolved components.

3. The multi-stage membrane distillation apparatus of claim 1, wherein each of the purification stages further includes:

a liquid-liquid heat exchanger in fluid communication with the liquid-permeate outlet of the condenser and configured for cooling condensed liquid permeate from the condenser; and a liquid-feed conduit extending from the source of liquid feed and including:

a bifurcation between (a) the liquid-feed source and (b) the condenser and the liquid-liquid heat exchanger in a flow path from the liquid-feed source through the liquid-feed conduit, where the bifurcation splits the liquid-feed conduit into respective conduits passing through the condenser and through the liquid-liquid heat exchanger; and a junction positioned and configured to rejoin the set of bifurcated conduits from the condenser and from the liquid-liquid heat exchanger into a common conduit extending toward and in fluid communication with the liquid-feed-containment chamber of the vacuum membrane distillation module, wherein the multi-stage membrane distillation apparatus further includes a liquid-permeate extraction conduit including a plurality of liquid-permeate inlets, each respectively in fluid communication with the liquid-permeate outlet of the condenser of a respective purification stage, wherein the liquid-permeate extraction conduit is configured to pass condensed liquid permeate from the liquid-permeate inlets through the liquid-liquid heat exchangers.

4. The multi-stage membrane distillation apparatus of claim 3, further comprising a liquid-permeate receptacle coupled with the liquid-permeate extraction conduit and configured to collect liquid permeate passed through the liquid-liquid heat exchangers.

5. The multi-stage membrane distillation apparatus of claim 3, further comprising a heat source configured to heat liquid feed flowing through the liquid-feed conduit before entering the feed-liquid containment chamber in the vacuum membrane distillation module of the first stage.

6. The multi-stage membrane distillation apparatus of claim 1, wherein the condenser is included in the vapor-permeate containment chamber and is configured to condense vapor that has passed through the gas-permeable membrane from the feed-liquid containment chamber.

7. A method for distillation of a feed liquid comprising:
passing portions of the feed liquid through a second condenser, through a first condenser, through a first liquid-liquid heat exchanger and through a second liquid-liquid heat exchanger; then heating the feed liquid; then injecting the feed liquid into a first feed-liquid containment chamber of a first vacuum membrane distillation module; then passing vapor from the feed liquid in the first feed-liquid containment chamber through a first gas-permeable membrane;

directing vapor that has passed through the first gas-permeable membrane into the first condenser, wherein the vapor first enters a first vapor-permeate containment chamber on an opposite side of the first-gas-permeable membrane from the first feed-liquid containment chamber before entering the first condenser or wherein the first condenser is combined with the first vapor-permeate containment chamber on the opposite side of the first-gas-permeable membrane from the first feed-liquid containment chamber, and where the vapor is cooled by the feed liquid passing through the first condenser and condenses as it cools to produce a first liquid permeate;

passing the first liquid permeate through the first liquid-liquid heat exchanger where the first liquid permeate is cooled by the feed liquid passing therethrough;

after the vapor is removed from the feed liquid in the first feed-liquid containment chamber, injecting the remaining feed liquid from the first feed-liquid containment chamber into a second feed-liquid containment chamber of a second vacuum membrane distillation module, wherein the feed liquid injected into the first feed-liquid containment chamber is at a temperature at least 1° C. higher than the temperature at which the remaining feed liquid is injected into the second feed-liquid containment chamber; then passing vapor from the feed liquid in the second feed-liquid containment chamber through a second gas-permeable membrane into a second vapor-permeate containment chamber;

actively reducing the pressure in the second vapor-permeate containment chamber to a pressure lower than the pressure in the first vapor-permeate containment chamber;

directing vapor that has passed through the second gas-permeable membrane into the second condenser, wherein the second condenser is combined with or downstream from the second vapor-permeate containment chamber, and where the vapor is cooled by the feed liquid passing through the second condenser and condenses as it cools to produce a second liquid permeate;

combining the first liquid permeate from the first liquid-liquid heat exchanger with the second liquid permeate from the second condenser to form a combined liquid permeate; and passing the combined liquid permeate through the second liquid-liquid heat exchanger where the combined liquid permeate is cooled by the feed liquid passing therethrough.

8. The method of claim 7, wherein the first and second permeates comprise water.

9. The method of claim 8, wherein the water is collected after passing through the second liquid-liquid heat exchanger.

10. The method of claim 7, wherein the feed liquid is split into a first portion that passes through the second condenser and a second portion that passes through the second liquid-liquid heat exchanger, wherein the first and second portions of the feed liquid are then recombined, wherein the recombined portions of the feed liquid are again split to form a third portion that passes through the first condenser and a fourth portion that passes through the first liquid-liquid heat exchanger, and wherein the third and fourth portions are then recombined before the feed liquid is injected into the first feed-liquid containment chamber.

11. The method of claim 7, wherein the first and second condensers are respectively combined with the first and second vapor-permeate containment chambers and are configured to condense vapor that has passed through the gas-permeable membranes from the feed-liquid containment chambers.

12. The method of claim 7, wherein the pressure in the second vapor-permeate chamber is at least 1 kPa lower than the pressure in the first vapor-permeate chamber.

13. The method of claim 7, wherein the pressure in the second vapor-permeate chamber is no more than 20 kPa lower than the pressure in the first vapor-permeate chamber.

14. The method of claim 7, wherein the pressure in the second vapor-permeate chamber is at least 3 kPa lower than the pressure in the first vapor-permeate chamber.

15. The method of claim 7, further comprising, after the vapor is removed from the remaining feed liquid in the second feed-liquid containment chamber, injecting the further concentrated remnant of the feed liquid into a third feed-liquid containment chamber of a third vacuum membrane distillation module, wherein the temperature in the second feed-liquid containment chamber is at least 1° C. higher than the temperature in the third feed-liquid containment chamber.

16. The method of claim 7, further comprising, after the vapor is removed from the feed liquid in the second feed-liquid containment chamber, transferring heat from a resulting brine of remaining feed liquid to the feed liquid before the feed liquid is passed through the second condenser, wherein the heat is transferred from the brine to the feed liquid via a heat exchanger or by mixing the brine with the feed liquid.

17. A multi-stage membrane distillation apparatus, comprising:
    a source of liquid feed;
    a first vacuum membrane distillation module, including:
        a first feed inlet in fluid communication with the source of liquid feed;
        a first gas-permeable membrane contained in the first vacuum membrane distillation module;
        a first feed-liquid containment chamber on one side of the first gas-permeable membrane and in fluid communication with the first feed inlet;
        a first vapor-permeate-containment chamber on an opposite side of the first gas-permeable membrane from the first feed-liquid containment chamber; and
        a first vapor-permeate outlet in fluid communication with the first vapor-permeate-containment chamber;
    a first condenser configured to condense vapor permeate from the first vapor-permeate outlet and including (a) a first vapor-permeate inlet in fluid communication with the first vapor-permeate outlet of the first vacuum membrane distillation module and (b) a first condensed liquid-permeate outlet through which condensed liquid permeate can be removed from the first condenser;
    a first liquid-liquid heat exchanger in fluid communication with the first liquid-permeate outlet of the first condenser;
    a second vacuum membrane distillation module, including:
        a second feed inlet;
        a second gas-permeable membrane contained in the second vacuum membrane distillation module;
        a second feed-liquid containment chamber on one side of the second gas-permeable membrane and in fluid communication with the second feed inlet;
        a second vapor-permeate containment chamber on an opposite side of the second gas-permeable membrane from the second feed-liquid containment chamber; and
        a second vapor-permeate outlet in fluid communication with the second vapor-permeate-containment chamber;
    a second condenser configured to condense vapor permeate from the second vapor-permeate outlet and including (a) a second vapor-permeate inlet in fluid communication with the second vapor-permeate outlet of the second vacuum membrane distillation module and (b) a second condensed liquid-permeate outlet through which condensed liquid permeate can be removed from the second condenser;
    a second liquid-liquid heat exchanger in fluid communication with the second liquid-permeate outlet of the second condenser;
    a liquid-feed conduit extending from the source of liquid feed and including:
        a first bifurcation where the liquid-feed conduit is split into respective conduits passing through the first condenser and through the first liquid-liquid heat exchanger;
        a first junction at which the first set of bifurcated conduits are rejoined into a first common conduit between the first condenser and the second condenser;
        a second bifurcation between the first junction and the second condenser where the common conduit is split into respective conduits passing through the second condenser and through the second liquid-liquid heat exchanger; and
        a second junction at which the second set of bifurcated conduits are rejoined into a second common conduit between the second condenser and the first vacuum membrane distillation module;
    a liquid-permeate extraction conduit including a first liquid-permeate inlet in fluid communication with the first liquid-permeate outlet of the first condenser and a second liquid-permeate inlet in fluid communication with the second liquid-permeate outlet of the second condenser, wherein the liquid-permeate extraction conduit is configured to pass condensed liquid permeate from the first liquid-permeate inlet through the first liquid-liquid heat exchanger, to combine condensed liquid permeate from the second liquid-permeate inlet with the liquid permeate passed through the first liquid-liquid heat exchanger, and to pass the combined condensed liquid permeate through the second liquid-liquid heat exchanger;
    a brine extraction conduit in fluid communication with the first and second feed-liquid containment chambers and configured to deliver brine from the first feed-liquid containment chamber to the second feed-liquid containment chamber, wherein the brine to be extracted is that which remains after gas is removed from the liquid via the first membrane;

a plurality of regulators in fluid communication with the first vapor-permeate-containment chamber, the first condenser, the second vapor-permeate-containment chamber, and the second condenser, and configured to extract a first reduced pressure in the first vapor-permeate-containment chamber and a second reduced pressure in the second vapor-permeate-containment chamber that is lower than the first reduced pressure; and a heat source configured to heat liquid feed flowing only through the liquid-feed conduit between the first condenser and the first vacuum membrane distillation module, wherein no other heat sources are configured to heat liquid feed in or between the vacuum membrane distillation modules.

* * * * *